(12) United States Patent
Olson

(10) Patent No.: US 6,564,278 B1
(45) Date of Patent: May 13, 2003

(54) SYSTEM AND METHOD FOR OBTAINING BOARD ADDRESS INFORMATION

(75) Inventor: Philip D. Olson, Kenwood, CA (US)

(73) Assignee: Ulysses ESD, Inc., San Jose, CA (US)

( * ) Notice: Subject to any disclaimer, the term of this patent is extended or adjusted under 35 U.S.C. 154(b) by 0 days.

(21) Appl. No.: 09/425,848

(22) Filed: Oct. 21, 1999

(51) Int. Cl.$^7$ .............................................. G06F 13/00
(52) U.S. Cl. ........................ 710/301; 710/303; 710/300
(58) Field of Search ................................. 710/300–304

(56) References Cited

U.S. PATENT DOCUMENTS 4,816,990 A * 3/1989 Williams .................... 709/400
5,491,830 A * 2/1996 Ferri ........................... 710/10

* cited by examiner

Primary Examiner—Rupal Dharia
(74) Attorney, Agent, or Firm—Gary S. Williams; Pennie & Edmonds LLP

(57) ABSTRACT

A backplane apparatus provides board address information for each board inserted in the slots of the backplane, using a single pin in the backplane slot. A unique address for a board in a backplane slot is identified by an analog address signal, which can be communicated on a single line and therefore requires only one pin in the backplane slot or in the device which will read the address information. The analog address signal is a function of a component, such as a resistor or a capacitor, coupled to the address pin in the backplane slot. A predefined characteristic of the component, such as the resistance or the capacitance, is unique for each slot. The component characteristic is converted into a corresponding characteristic of the analog address signal, such as the voltage, current, frequency or the slope of a voltage or current ramp, so that the analog address signal is measurably different for every slot.

23 Claims, 3 Drawing Sheets

SYSTEM AND METHOD FOR OBTAINING BOARD ADDRESS INFORMATION

The present invention relates generally to digital systems, and particularly to obtaining the identification or address of a board which may be plugged into a backplane.

BACKGROUND OF THE INVENTION

The present invention is an improved method and apparatus for obtaining board address information for boards which are plugged into slots in a backplane. Typical backplanes may have twenty or more slots, requiring five or more bits to identify the binary address for each board. The board interface to the backplane will include one reserved pin for each address bit. The pins typically have pull-up resistors, and the backplane connectors have various bits grounded on each slot corresponding to the slot address. As an example, slot 0 would have all five pins grounded, representing binary "0", while slot 1 would have the four most significant bits grounded and the least significant bit floating, representing binary "1." Each slot in the backplane thus has its own unique binary address.

A problem arises when there are not enough spare pins on the backplane to implement this addressing scheme. Alternatively, the device that reads the address may not have sufficient spare pins. Thus, it is desired to provide a method and apparatus for providing backplane slot address information using a single pin.

SUMMARY OF THE INVENTION

In summary, the present invention is an apparatus and method for providing board address information for a board in a backplane using a single pin in the backplane slot. A unique address for a board in a backplane slot is identified by an analog address signal, which can be communicated on a single line and therefore requires only one pin in the backplane slot or in the device which will read the address information. The analog address signal is a function of a component, such as a resistor or a capacitor, coupled to the address pin in the backplane slot. A predefined characteristic of the component, such as the resistance or the capacitance, is unique for each slot. The component characteristic is converted into a corresponding characteristic of the analog address signal, such as the voltage, current, frequency or the slope of a voltage or current ramp, so that the analog address signal is measurably different for every slot.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
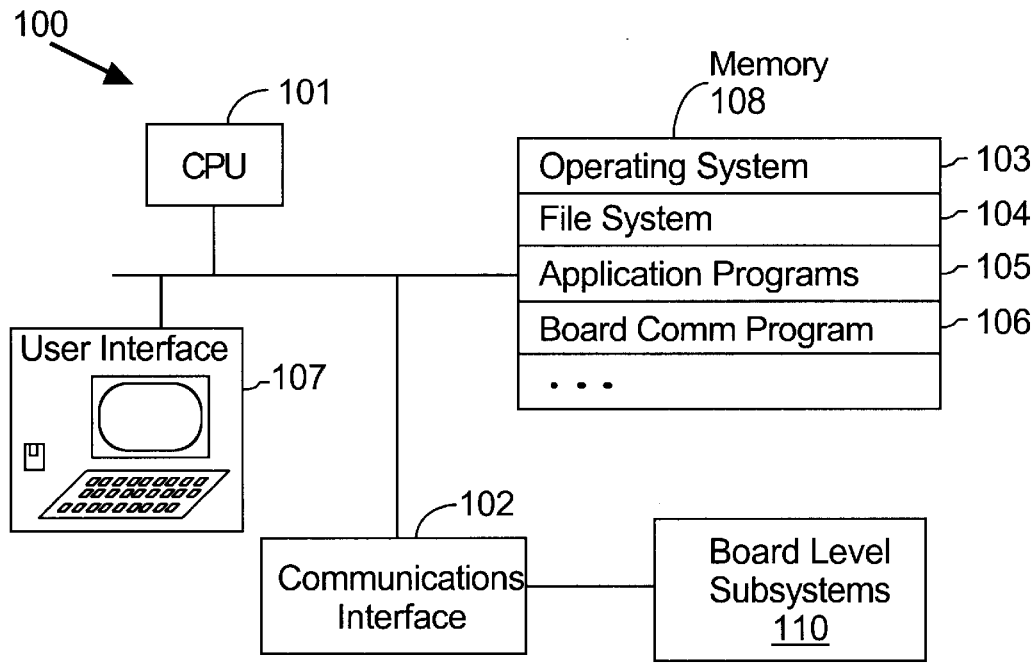
FIG. 1 illustrates a digital system which might be composed in part of various boards plugged into a backplane.

The computer system 100 illustrated in FIG. 1 includes one or more CPU's 101, a communications interface 102, a user interface 107, memory 108 and a set of board level subsystems 110. The memory 108 includes an operating system 103, file system 104, applications programs 105 and a board communications program 106 that handle communications with the board level subsystems 110.

Figure 2:
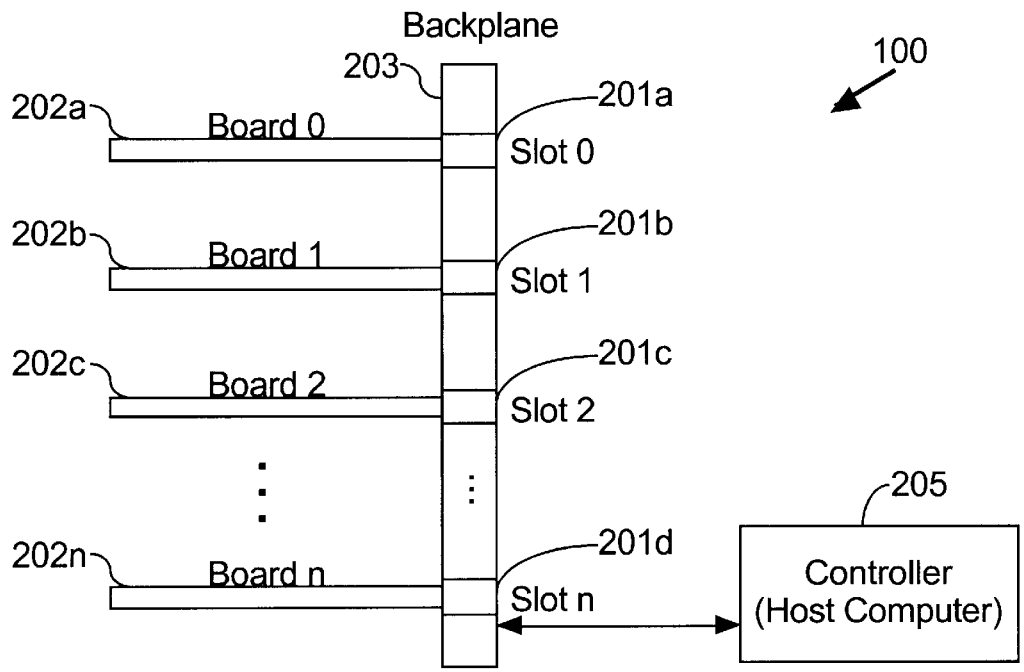
FIG. 2 illustrates a backplane with slots and boards plugged into the slots.

As shown in FIG. 2, the system 100 may be implemented as a set of boards 202 that are plugged into slots 201 on a backplane 203. A host controller 205 corresponds to the system components shown in FIG. 1, other than the board level subsystems 110. The host controller 205 may be implemented as one of the boards 202.

In order for the board communications program 106 in the host controller to communicate with the various boards 202, the address of each board 202—that is, the location of the slot 201 into which the board 202 is plugged—must be known. In the prior art, addresses for each slot require a separate pin for each bit in the address, so that, for example, if there are between 17 and 32 slots in a backplane, at least five bits, and therefore five pins, will be required to communicate the address for each slot.

Figure 3:
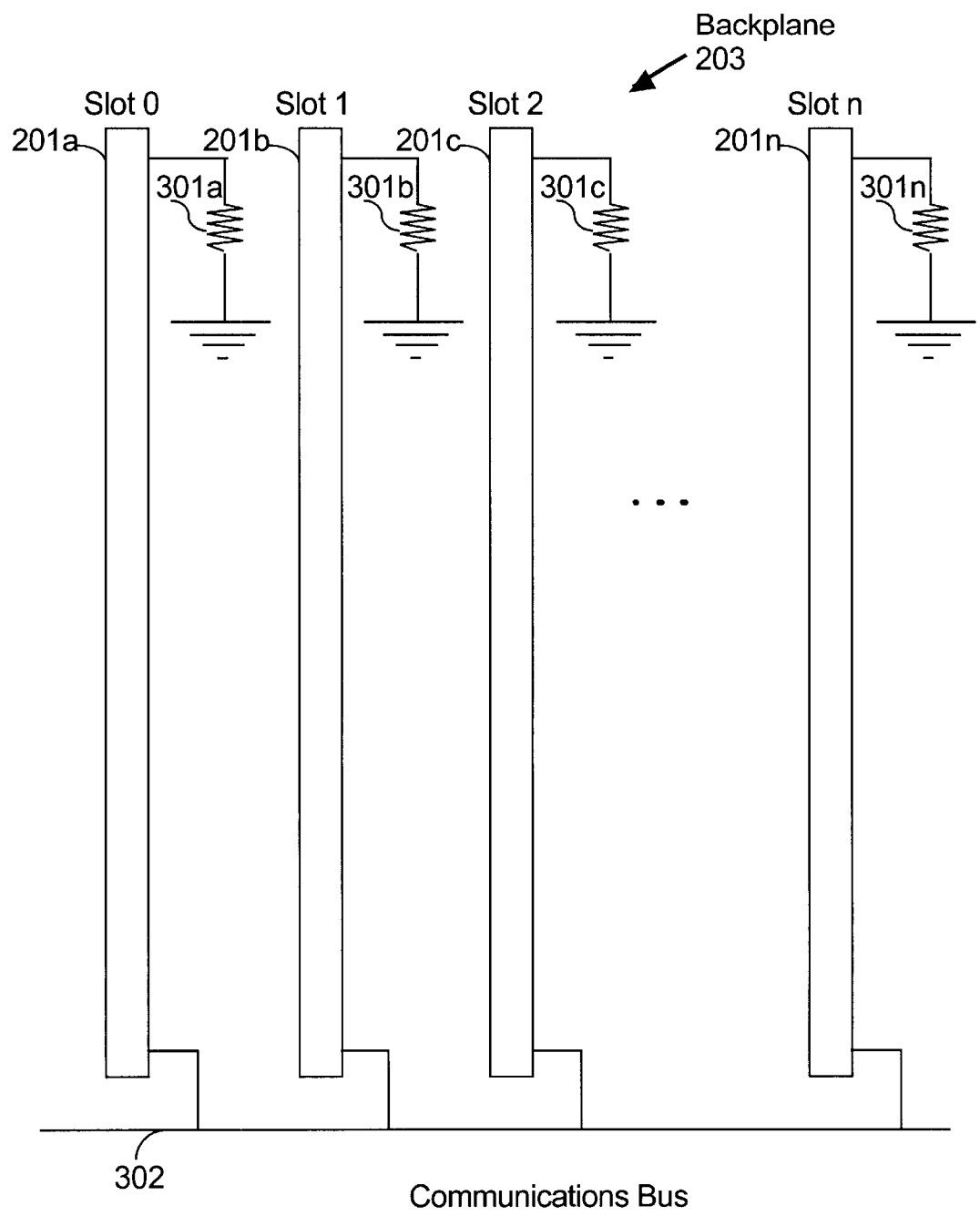
FIG. 3 illustrates the slot configuration for one embodiment of the invention.

In the present invention, the address for each slot is identified using an analog, rather than a digital, signal. The analog address signal is a function of a component coupled to the address pin for each slot. For example, in the embodiment illustrated in FIG. 3, there is a slot resistor 301 coupled at a first end to the address pin for each slot 201 of the backplane 203, with the second end of the resistor 301 coupled to a circuit ground node. The slot resistors 301 for each of the slots 201 have different values, which result in measurably different voltage drops across each register 301.

Figure 4:
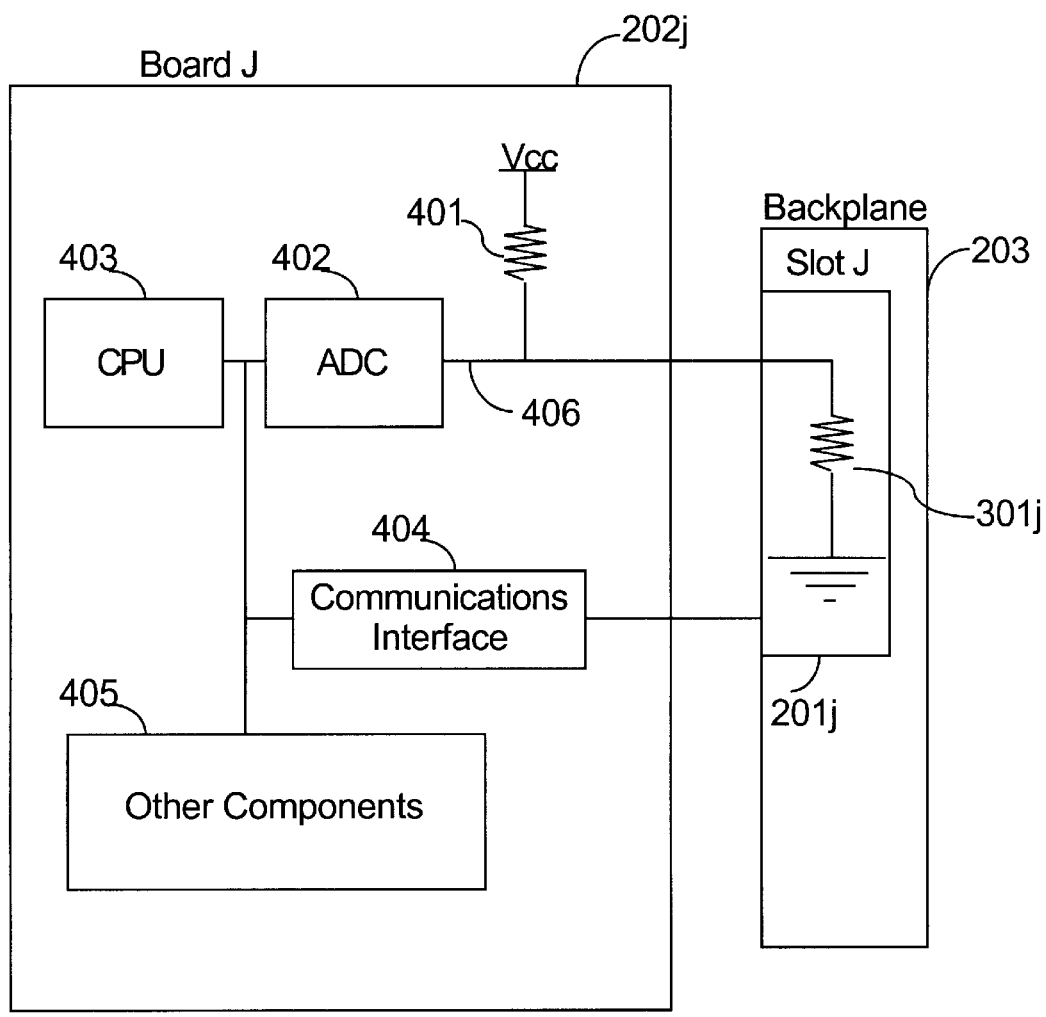
FIG. 4 illustrates the board configuration for one embodiment of the invention.

A measurement circuit is included on each board 202 to determine the slot address. For the preferred embodiment, as shown in FIG. 4, each board 202 includes a source resistor 401 that couples to the slot resistor 301 of the backplane slot 201 in which the board is inserted. The two resistors 401 and 201 from a resister divider circuit having a central node 406.

The end of the source resistor 401 that is not coupled to the backplane slot resistor is tied to the supply voltage Vcc. The output of the divider circuit on node 406 is a DC signal, which is a function of the unique value of the slot resistor 301, as well as of the value of the source resistor 401, which is preferably the same for each board 202. The unique DC signal is input to an analog-to-digital converter 402, which outputs a unique digital address for the board. Alternately, the analog-to-digital converter 402 outputs a digital value that is then converted by the CPU 403 on the board into a unique digital address for the board in accordance with a predefined mapping function.

The resistor values for the slot resistors 301 are preferably chosen such that the voltage steps from one slot to the next are linear. For example, in a twelve-slot backplane, if the resistor 401 on the board 202 is a 1 kΩ resistor and the supply voltage Vcc is five volts, the following values for the slot resistors 301 will provide voltage steps between slots of approximately 0.4 volts:

| Slot # | Resistor Value (Ω) | Voltage |
| --- | --- | --- |
| 0 | 0 | 0 |
| 1 | 86.6 | 0.40 |
| 2 | 191 | 0.80 |
| 3 | 316 | 1.20 |
| 4 | 475 | 1.61 |
| 5 | 665 | 2.00 |

-continued

| Slot # | Resistor Value (Ω) | Voltage |
|---|---|---|
| 6 | 931 | 2.41 |
| 7 | 1.27k | 2.80 |
| 8 | 1.78k | 3.20 |
| 9 | 2.55k | 3.59 |
| 10 | 4.02k | 4.00 |
| 11 | 7.32k | 4.40 |
| 12 | 24.3 k | 4.80 |

Because the slot resistor 301 values are selected in an exponential fashion, the resultant voltage is linear.

In addition to providing board address information, the analog address signal can be used to identify error conditions. For example, if there is an open pin failure, the analog signal will be equal to the supply voltage—in the present example, a five volt DC value. The value of zero volts may be reserved to identify other error conditions, such as a shorted pin or an open board resistor.

In a typical application, each of the boards 202 performs a particular system function, such as controlling the speed of a fan, generating current for other devices, and the like. The boards 202 send messages to the host controller 205 over the communications bus 302, for example to report on the status of the boards 202. The host controller 205 also sends control messages to the boards 202. When the system 100 is initialized, each board 202 sends a message, including its slot address value, to the host controller. The host controller 205 then sends messages to the boards 202 using the slot address provided by each board 202. Each message sent by the host controller 205 includes an embedded address value corresponding to the slot address of a board 202. Each board 202, after identifying its backplane location to the host controller 205, only listens to messages having the address corresponding to its slot 201.

Alternate Embodiments

In the preferred embodiment, the values of the slot resistors 201 are selected exponentially, such that the voltage values for the analog signal are linear. However, it is also possible to select the slot resistors 201 in a linear fashion to obtain an exponential voltage. Alternatively, arbitrary slot resistor 301 values could be used, so long as there is a measurably unique analog signal for each slot. Resolution of the analog address signal is limited only by the precision of the slot resistors 301 and the board resistors 401, and the accuracy of the analog-to-digital converter 402.

In an alternative embodiment, the board resistor 401 tied to the source voltage could be replaced by a current source. The voltage at the output of the current source will be equal to the voltage drop across the uniquely-valued slot resistor 301. The voltage at the output of the current source is input to an analog-to-digital converter, which outputs a unique digital address. This approach results in linear voltage values when the resistor values are selected in a linear fashion.

Alternatively, the current, rather than the voltage, could be determined by the measuring circuit. Given a unique value for the slot resistor 301, the current at the measuring circuit will also be unique and therefore suitable for providing a unique board address.

In the above examples, the analog address signal is a DC signal, and the address information is contained in either the voltage or the current. However, the analog address information could also be a waveform such as a sinusoid or a pulse, with the address information contained in a non-zero frequency component of the signal. The component coupled to the address pin for each slot would be a component with a response which varies as a function of frequency, such as a capacitor or an inductor. For example, a capacitor with a unique value could be coupled to each slot, to shift the frequency of a sinusoidal waveform or to delay a pulse. Similarly, a voltage or current ramp could be used, with the slope of the ramp varying as a function of the component coupled to the address pin. Again, the component would have a response which varies as a function of frequency, such as a capacitor or an inductor. For example, a capacitor to ground could be coupled to each slot address pin, with the source of the ramped voltage or current on the board, coupled to the capacitor. The ramp slope would then be inversely related to the capacitance. The signal could be converted to digital form and the slope could be measured by a processor following the digital-to-analog converter. So long as the slope of the ramp could be uniquely determined for each slot, this is sufficient to provide board address identification.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. Apparatus for identifying a slot in a backplane, comprising a backplane having a plurality of slots for receiving boards; the backplane having, for each slot, a respective electronic component having an associated electrical characteristic that is measurably distinct from the same electrical characteristic of the respective electronic component of the other slots;

a board coupled to one of the slots of the backplane, the board including a measurement circuit coupled to the electronic component of the one slot, the measurement circuit generating a first signal that is a function of the electrical characteristic of the electronic component of the one slot, the first signal indicating to which of the plurality of slots the board is coupled.

2. The apparatus of claim 1, wherein the board includes data processing apparatus for converting the first signal into a slot identification value and for transmitting a first message including the slot identification value.

3. The apparatus of claim 2, further including a controller for receiving the message and for sending a second message to the board using a slot address corresponding to the slot identification value.

4. The apparatus of claim 1, wherein a predefined value of the first signal identifies an error condition.

5. The apparatus of claim 1, wherein the electronic component is a resistor.

6. The apparatus of claim 5, wherein the resistors in the plurality of slots have resistances which differ from one slot to the next such that the measured voltages from one slot to the next differ by a fixed voltage.

7. The apparatus of claim 5, wherein the measurement circuit includes a resistor coupled to the resistor of the slot so as to form a resistor divider having a central node, and an analog to digital converter coupled to the central node, the analog to digital converter generating a digital slot identification value.

8. The apparatus of claim 5, wherein the measurement circuit includes a current source coupled to the resistor of the slot, and an analog to digital converter coupled to the resistor of the slot, the analog to digital converter generating a digital slot identification value.

9. The apparatus of claim 1, wherein the electronic component of each slot has a frequency response that is measurably different from the frequency response of the respective electronic component of the other slots, and the first signal is a function of the frequency response of the electronic component of the slot.

10. The apparatus of claim 9, wherein the electronic component is a capacitor.

11. The apparatus of claim 9, wherein the measurement circuit includes a ramp voltage source, the electronic component is a capacitor, and the first signal is a ramped voltage whose slope is a function of the capacitance of the capacitor.

12. The apparatus of claim 9, wherein the measurement circuit includes a ramp current source, the electronic component is a capacitor, and the first signal is a ramped current whose slope is a function of the capacitance of the capacitor.

13. A method for identifying board addresses, comprising:
providing a backplane having a plurality of slots for receiving boards;
inserting a board into each of one or more of the slots; and
for each slot which has an inserted board, generating within the backplane an analog signal with a signal characteristic that is measurably distinct from the signal characteristic of every other slot which has an inserted board.

14. The method of claim 13 further comprising:
converting the analog signal into a slot identification value; and
transmitting a message including the slot identification value from one of the inserted boards.

15. The method of claim 13 further comprising:
providing a controller;
receiving the first message including the slot identification value at the controller; and
sending a second message from the controller to a board using a slot address corresponding to the slot identification value.

16. The method of claim 13, wherein generating the analog signal for each inserted board includes providing at each slot an electronic component having an associated electrical characteristic that is measurably distinct from the same electrical characteristic of the respective electronic component of the other slots.

17. The method of claim 16, wherein the electronic component is a first resistor.

18. The method of claim 17, wherein the measurably distinct analog signal is a voltage generated by a resistor divider having a second resistor on each inserted board, each second resistor being coupled to the first resistor so as to form a voltage divider, the measurably distinct analog signal being measured across said first resistor.

19. The method of claim 18, wherein converting the analog signal into a slot identification signal includes converting the output of the resistor divider into a digital signal.

20. The apparatus of claim 1, wherein the electrical characteristic of each respective electronic component is an analog electrical characteristic and the first signal is a multi-bit digital signal.

21. The apparatus of claim 20, wherein the measurement circuit is coupled to the electronic component of the one slot by only a single pin.

22. The apparatus of claim 1, wherein the measurement circuit is coupled to the electronic component of the one slot by only a single pin.

23. The method of claim 13, including communicating the analog signal through a single pin to the inserted board.

* * * * *